US 6,720,983 B1

(12) United States Patent
Massaro et al.

(10) Patent No.: US 6,720,983 B1
(45) Date of Patent: Apr. 13, 2004

(54) DIGITAL FEEDBACK DISPLAY PANEL FOR COMMUNICATING COMPUTER STATUS INFORMATION

(75) Inventors: Kevin L. Massaro, Houston, TX (US); Anthony B. Rorke, Satellite Beach, FL (US); Stacy L. Wolff, Houston, TX (US); Ajay Chaturvedi, Houston, TX (US); Valiuddin Y. Ali, Houston, TX (US); John M. Stivoric, Pittsburgh, PA (US); Eric Teller, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/478,153

(22) Filed: Jan. 5, 2000

(51) Int. Cl.[7] ............................. G09G 5/00; G06F 1/26; G06F 3/00
(52) U.S. Cl. ....................... 345/846; 713/340; 710/15; 710/17; 710/19
(58) Field of Search .................... 713/340; 345/846, 345/864, 736, 866; 710/15, 17, 19

(56) References Cited

U.S. PATENT DOCUMENTS

| | | | | |
|---|---|---|---|---|
| 5,301,348 A | | 4/1994 | Jaaskelainen | 395/800 |
| 5,333,256 A | | 7/1994 | Green et al. | 395/159 |
| 5,617,526 A | | 4/1997 | Oran et al. | 395/326 |
| 5,646,535 A | * | 7/1997 | Dornier | 324/133 |
| 5,691,742 A | * | 11/1997 | O'Connor et al. | 320/DIG. 21 |
| 5,809,449 A | * | 9/1998 | Harper | 702/60 |
| 5,905,914 A | * | 5/1999 | Sakai et al. | 700/83 |
| 5,953,010 A | | 9/1999 | Kampe et al. | 345/348 |
| 6,014,141 A | * | 1/2000 | Klein | 345/3.1 |
| 6,121,967 A | * | 9/2000 | Foster et al. | 345/772 |
| 6,272,628 B1 | * | 8/2001 | Aguilar et al. | 713/2 |
| 6,311,283 B1 | * | 10/2001 | Gonzalez | 713/400 |

OTHER PUBLICATIONS

CheckPOP Standard Edition by n–Systems. Captured Dec. 3, 1998. http://web.archive.org/web/19981203162853/http://www.n–systems.com/checkpop/.*

* cited by examiner

*Primary Examiner*—John Cabeca
*Assistant Examiner*—Brian Detwiler

(57) ABSTRACT

A personal computer system provides a digital feedback display panel and supporting software to provide digital computer status feedback for a user. The digital feedback display panel is integrated with a computer housing of the computer system. The supporting software detects status notification messages which are processed and communicated to the digital feedback display panel. The digital feedback display panel provides display feedback to the user based on the detected status notification messages. The display feedback can take the form of status icons and blinking text messages displayed on the digital feedback display panel. Examples of status conditions of the computer system which can be communicated to the user include (i) a connection state of a peripheral device to the computer system, (ii) the computer system is connected to the Internet, (iii) an indication of how many unread e-mails for the computer system are available, and (iv) network time for a server coupled to the computer system.

6 Claims, 9 Drawing Sheets

200

| |
|---|
| MSC_STARTING |
| MSC_EXITING |
| MSC_IALIVE_DETECTED |
| MSC_IALIVE_NOTDETECTED |
| MSC_STARTING_RAS_DIAL |
| MSC_ENDING_RAS_DIAL |
| MSC_RAS_ERROR_ABORTING |
| MSC_USER_DISABLED_ABORTING |
| MSC_NO_POP_ACCOUNTS_ABORTING |
| MSC_INVALID_POP_ACCOUNT_ABORTING |
| MSC_MISC_ERROR_ABORTING |
| MESC_GETTING_MESSAGES |
| MSC_GOT_MESSAGES |
| MSC_UPDATING_LED |
| MSC_DONE_UPDATING_LED |

| |
|---|
| DEVGULP_STARTING |
| DEVGULP_EXITING |
| DEVGULP_DEV_ARRIVED |
| DEVGULP_DEV_REMOVED |
| DEVGULP_DRIVE_ARRIVED |
| DEVGULP_DRIVE_REMOVED |
| DEVDET_PRIMARY_DEV_FOUND |
| DEVDET_PRIMARY_DEV_NOT_FOUND |

| |
|---|
| IALIVE_STARTING |
| IALIVE_EXITING |
| IALIVE_RAS_CONNECTED |
| IALIVE_RAS_CONNECTED |

FIG. 8

DIGITAL FEEDBACK DISPLAY PANEL FOR COMMUNICATING COMPUTER STATUS INFORMATION

CROSS REFERENCE TO RELATED APPLICATIONS

The following patent applications are incorporated herein by reference in their entirety for all purposes:

U.S. patent application Ser. No. 09/478,141, entitled CPU EASY ACCESS PANELS, filed concurrently by Troy Anthony Della Fiora, Kevin L. Massaro, and Kevin W. Mundt.

U.S. patent application Ser. No. 29/116,545, entitled EASY ACCESS TOWER COMPUTER, filed concurrently by Kevin L. Massaro, Stacy L. Wolff, and Anthony B. Rorke.

U.S. patent application Ser. No. 29/116,559, entitled PERSONAL COMPUTER DASHBOARD, filed concurrently by Kevin L. Massaro, Stacy L. Wolff, John Stivoric, Eric Teller and Anthony B. Rorke.

BACKGROUND OF THE INVENTION

1. Field of the Invention

The present invention relates to a digital feedback display panel and supporting software for a computer user.

2. Description of the Related Art

Many personal computers have failed to address many of the real interaction needs of users. As personal computers increasingly become a consumer commodity, many of the new opportunities for product differentiation in the consumer personal computer marketplace will likely come from addressing real consumer needs and desires through new avenues of industrial design and interaction design.

One common concern of users has been the difficulty in setting up personal computers. Similarly, users have experienced frustration in using computers due to poor information or lack of useful information altogether.

SUMMARY OF THE INVENTION

Briefly, a computer system provides a digital feedback display panel and supporting software to provide digital computer status feedback for a user. The digital feedback display panel is integrated with a computer housing of the computer system. The supporting software detects status notification messages which are processed and communicated to the digital feedback display panel. The digital feedback display panel provides display feedback to the user based on the detected status notification messages. The display feedback can take the form of status icons and blinking text messages displayed on the digital feedback display panel. Examples of status conditions of the computer system which can be communicated to the user include (i) a connection state of a peripheral device to the computer system, (ii) whether the computer system is connected to the Internet, (iii) an indication of how many unread e-mails for the computer system are available, and (iv) network time for a server coupled to the computer system.

BRIEF DESCRIPTION OF THE DRAWINGS

A better understanding of the present invention can be obtained when the following detailed description of the preferred embodiment is considered in conjunction with the following drawings, in which:

FIG. 2 is a table of exemplary notification messages for the mail status checker software module of FIG. 1;

FIG. 7 is a table of exemplary notification messages for the device detect software module of FIG. 1;

FIG. 8 is a table of exemplary notification messages for the Internet detect software module of FIG. 1;

DETAILED DESCRIPTION OF PREFERRED EMBODIMENT

Software Architecture

Figure 1:
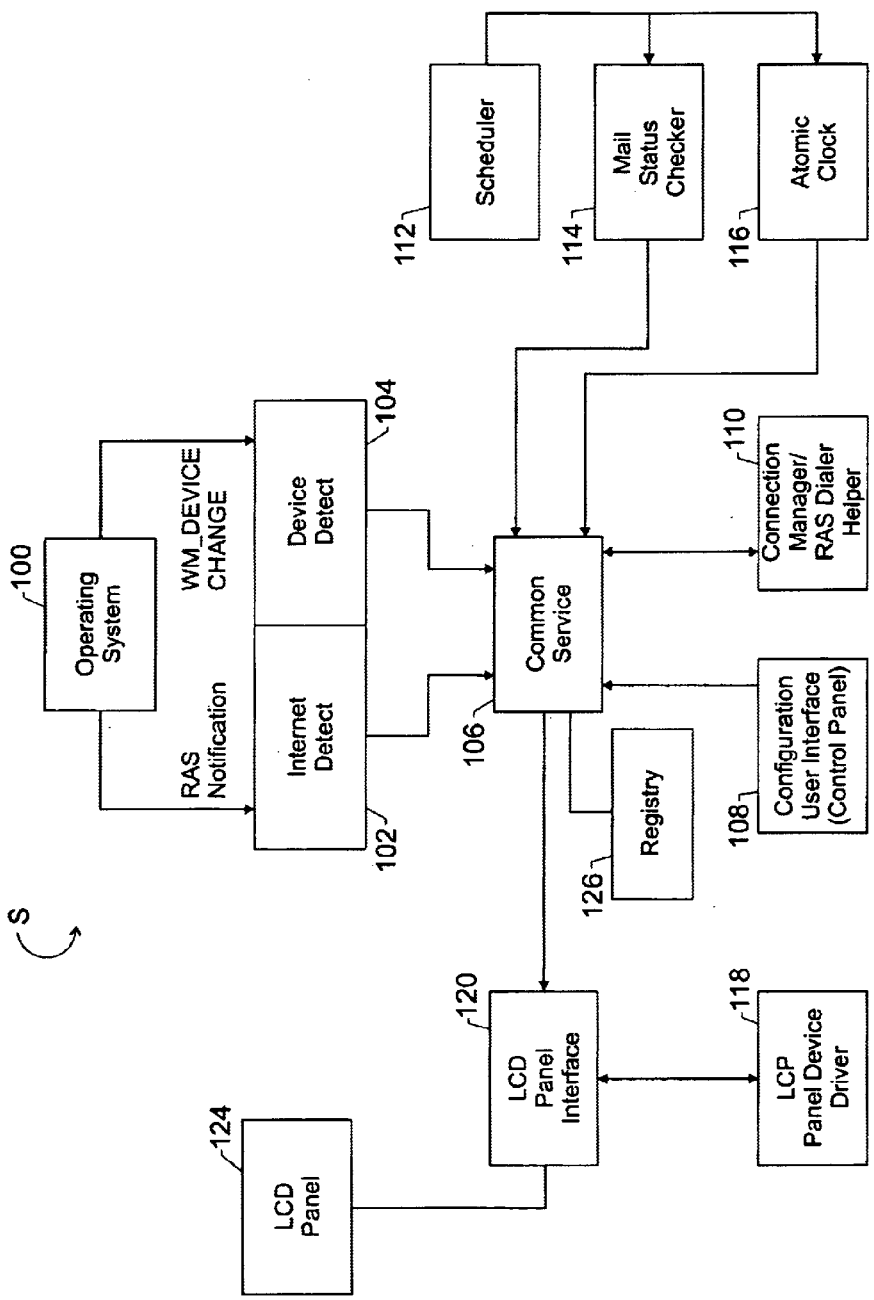
FIG. 1 is a schematic diagram of an exemplary notification software architecture for a digital feedback display panel of a computer system.

Turning now to the drawings, FIG. 1 shows an exemplary software architecture for supporting a digital feedback display panel 124 of a computer system S. As described in more detail below, the feedback display panel 124, in this case implemented as liquid crystal display (LCD) panel, provides feedback information to a user regarding certain conditions and functions of the computer system S of benefit to the user. An operating system 100 is configured to provide status condition notification messages to an Internet detect software module 102 and a device detect software module 104. The status condition notification messages are decoded by the Internet detect software module 102 and the device detect software module 104 and then routed to the digital feedback display panel 124 through a common services software module 106. The digital feedback display panel 124 provides feedback to the user based on the particular status condition notification message. Status condition notification messages can also be detected by a mail status checker software module 114 and an atomic clock software module 116. These status condition notification messages are also routed to the digital feedback display panel 124 through the common services module 106. Scheduling of the mail status checker module 114 and the atomic clock module 116 can be controlled by an operating system scheduler software module 112. The status condition messages received by the mail status checker module 114 and the atomic clock module 116 are obtained through an Internet connection of the computer system S.

The common services module 106 is shown coupled to a registry 126, a configuration user interface 108, and a connection manager/remote access services (RAS) dialer helper 110. The registry 126 is used in connection with retrieving status condition notification messages relevant to the mail status checker module 114. As described in more detail below, the configuration user interface 108 permits a user to configure various of the disclosed software modules and to enable or disable the functionality of the digital feedback display panel 124. The configuration user interface 108 communicates with the digital feedback display panel 124 through the common services module 106 and a display panel interface 120. The display panel interface 120 allows a user-mode application to communicate with the digital feedback display panel 124. Coupled to the display panel interface 120 is a display panel device driver 118 which facilitates further communication between the disclosed software modules and the feedback display panel 124. In an alternative embodiment, the display panel device driver 118 can be used in place of the common services module 106 and the display panel interface 120. The connection manager/RAS dialer helper 110 is used in connection with retrieving status condition notification messages relevant to the mail status checker module 114 and the atomic clock module 116. In a disclosed embodiment, the display panel device driver 118 is implemented as a Windows driver model (WDM) driver and the display panel interface 120 is implemented as a high-level component object model (COM) component. In a disclosed embodiment, the feedback display panel 124 is populated in the computer system S as a plug-and-play (PNP) device with an input/output (I/O) resource with an associated interrupt request (IRQ).

Aside from the mail status checker module 14 and the atomic clock module 116, in an alternative embodiment, other modules which can be launched by the scheduler module 112 may be supported. An example of such a software module is a power monitor module for monitoring or detecting a power state of the computer system S. The power monitor module can communicate whether the computer system S is in an on state, off state, or sleep state to the user through the digital feedback display panel 124. Thus, a variety of functions and conditions of the computer system S can be monitored and displayed to a user through the digital feedback display panel 124.

Common Services Module

Figure 4:
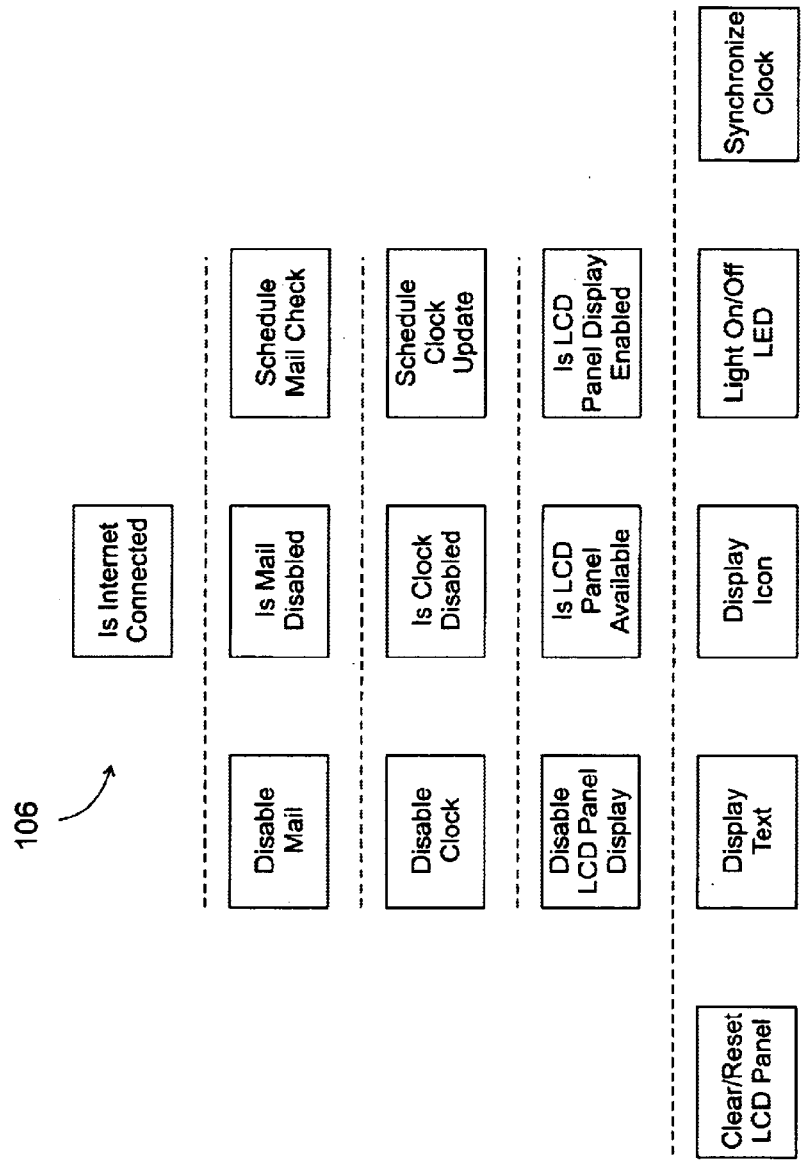
FIG. 4 is an illustration of exemplary services of the common services software module of FIG. 1.

The common services module 106 handles a host of functions in connection with other modules. Referring to FIG. 4, exemplary functions or services which the common services module 106 can handle are shown. For the benefit of the mail status checker module 114 or the atomic clock module 116, the common services module 106 may determine via the Internet detect module 102 whether the computer system S is connected to the Internet. Turning to the second row of functions which is related to the mail status checker module 114, the common services module 106 can be used in connection with disabling the mail status checker module 114, determining if the mail status checker module 114 is disabled and scheduling the mail status checker 114 module to perform an email check. The configuration user interface module 108 is used for disabling the mail status checker module 114 via the common services module 106. The scheduler module 112 is used for scheduling the mail status checker module 114 to perform an email check.

Turning to the third row of the services which is related to the atomic clock module 116, the common services module 106 can be used in connection with disabling the atomic clock module 116, determining if the atomic clock module 116 is disabled and scheduling the atomic clock module 116 to update a display clock for the digital feedback display panel 124. The configuration user interface module 108 is used for disabling the atomic clock module 116 via the common services module 106. The scheduler module 112 is used for scheduling a clock update by the atomic clock module 116.

Turning to rows four and five of the services which are related to the digital feedback display panel 124, the common services module 106 is used in connection with (i) disabling the digital feedback display panel 124, (ii) determining if the digital feedback display panel 124 is available, (iii) determining if the digital feedback display panel 124 is enabled, (iv) clearing or resetting the digital feedback display panel 124, (v) displaying text on the digital feedback display panel 124 as feedback to the user, (vi) displaying an icon on the digital feedback display panel 124 as feedback to the user, (vii) setting a light emitting diode proximate to of the digital feedback display panel 124 to an on state or off state as feedback to the user, and (viii) synchronizing the display clock with the operating system clock of the computer system S.

Figure 5:
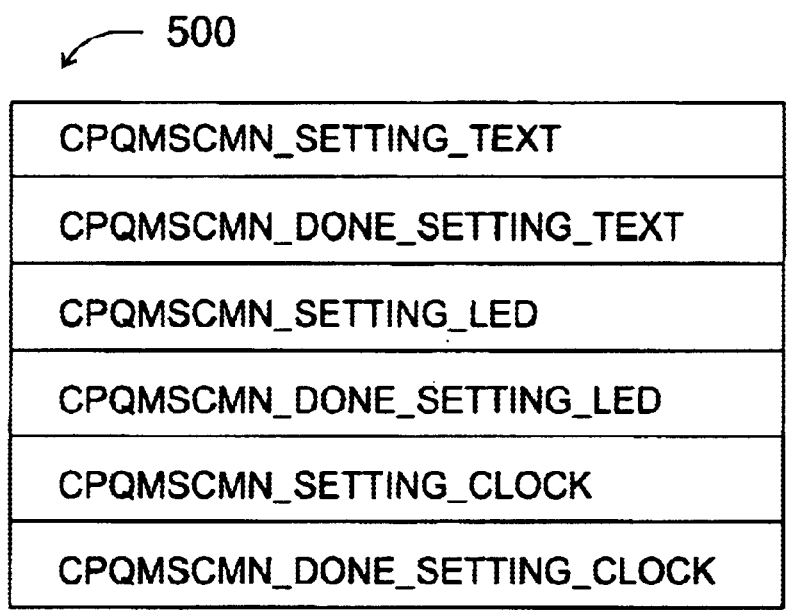
FIG. 5 is a table of exemplary notification messages for the mail status checker software module of FIG. 1.

Referring to FIG. 5, exemplary messages for the common services module 116 are shown. A CPQMSCMN_SETTING_TEXT message is used by the common services module 106 to set text for the digital feedback display panel 124. A CPQMSCMN_DONE_SETTING_TEXT messages indicates that the common services module 106 has completed its setting of text for the digital feedback display panel 124. A CPQMSCMN_SETTING_LED message is used by the common services module 106 to set a light emitting diode (LED) proximate to the feedback display panel 124. One portion of the message can indicate which LED is to set, and another portion of the message can indicate whether the LED should be set to an on or off state. A CPQMSCMN_DONE_SETTING_LED message indicates that the common services module 106 has completed its setting of a LED. A CPQMSCMN_SETTING_CLOCK message is used by the common services module 106 to set the time for the display clock of the digital feedback display panel 124. A CPQMSCMN_DONE_SETTING_CLOCK message is used by the common services module 106 to indicate that the common services module 106 has completed its setting of the display clock of the digital feedback display panel 124.

Internet Detect Module

The Internet detect module 102 decodes a network notification, such as a remote access services (RAS) notification, from the operating system 100 to determine whether there is an active Internet connection for the computer system S. While the RAS protocol is mentioned herein, it should be understood that the disclosed software architecture can be configured to apply to other network connection protocols such as home networking, digital subscriber loop (DSL), or data over cable service interface specification (DOCSIS), a cable modem protocol, for example. The Internet connection state information is passed by the Internet detect module 102 to the common services module 106 for direction to the digital feedback display panel 124. Completion of detection of the state of the Internet connection for the computer system S is also communicated by the Internet detect module 102 to the common services module 106. The Internet detect module 102 can also be configured to verify that the computer system S can communicate with its server over the Internet. The logical functionality of the Internet detect module 102 can be integrated with the device detect module 104. Alternatively, the two modules can be logically distinct.

Referring to FIG. 8, exemplary messages for the Internet detect module 102 are shown. An IALIVE_STARTING message indicates that the Internet detect module 102 is starting to detect the state of the Internet connection for the computer system S. An IALIVE_EXITING message indicates that the Internet detect module 102 is exiting or completing its detection of the state of the Internet connection for the computer system S. An IALIVE_RAS_CONNECTED message indicates that the Internet detect module 102 has determined that there is an active Internet connection for the computer system S. An IALIVE_RAS_DISCONNECTED message indicates that the Internet detect module 102 has determined that there is not an active Internet connection for the computer system S. It should be understood that these examples of messages which the Internet detect module 102 can provide are illustrative and not exhaustive.

Device Detect Module

The device detect module 104 decodes a WM_DEVICECHANGE message into a meaningful notification message sent to the common services module 106. The WM_DEVICECHANGE message can be used to monitor certain devices in the computer system S such as universal serial bus (USB) devices, IEEE 1394 devices, zip drives and network drives. The message may also be used to monitor the states of certain peripheral devices such as a keyboard or mouse. If the peripheral device is a USB device, then the device detect module 104 employs USB-based human interface device (HID) enumeration techniques to detect the peripheral device. Each peripheral device for detection can conform to the HID usage model.

Referring to FIG. 7, exemplary messages for the device detect module 104 are shown. A DEVGULP_STARTING message indicates that the device detect module 104 is starting to detect the state of a device. A DEVGULP_EXITING message indicates that the device detect module 104 is exiting or completing its detection of a state of a device. A DEVGULP_DEV_ARRIVED message indicates a particular device is present or connected to the computer system S. A DEVGULP_DEV_REMOVED message indicates that a particular device is absent or disconnected from the computer system S. A DEVGULP_DRIVE_ARRIVED message indicates that a particular drive is present or connected to the computer system S. A DEVGULP_DRIVE_REMOVED message indicates that a particular drive is absent or disconnected from the computer system S. A DEVDET_PRIMARY_DEV_FOUND message indicates that a peripheral device (e.g., mouse or keyboard) is present or connected to the computer system S. A DEVDET_PRIMARY_DEV_NOT_FOUND message indicates that a peripheral device is absent or disconnected from the computer system S. It should be understood that these examples of messages which the device detect module 104 can provide are illustrative and not exhaustive.

Before detecting a WM_DEVICECHANGE mesage, the device detect module 104 can check to see if its functionality is enabled. As described in more detail below, a user through the configuration user interface module 108 can enable and disable the device detect module 104.

Mail Status Checker Module

The mail status checker module 114 is used to monitor or detect unread e-mail messages for the computer system S. The relevant mail accounts are obtained by the mail status checker module 114 from the registry 126. The registry 126 may contain a list of multiple user configured mail accounts. Email accounts can be pulled from the registry 126 if the registry 126 is provided with a server name and password. The mail status checker module 114 can be launched by the scheduler module 112. Before running, however, the mail status checker module 114 determines if its functionality is currently enabled, whether there are active and properly configured mail accounts, and whether there is an active Internet connection available for the computer system S. If these conditions are met, then the mail status checker module 114 fetches the number of unread e-mail messages from the configured mail accounts. If any number of e-mail messages are available, then an LED of the digital feedback display panel 124 can be set to blink or pulse (i.e., an on state). If there are no e-mail messages available, then an LED proximate to the digital feedback display panel 124 can be set to an off state. In this way, the LED serves as a message light.

If the mail status checker module 114 determines that there is not an active Internet connection currently available for the computer system S, then the mail status checker module 114 signals the connection manager/RAS dialer helper 110 to initiate a RAS dialup connection. Once the connection is complete, the mail status checker module 114 fetches the number of unread e-mail messages and then self terminates. Alternatively, the mail status checker module 114 can be configured to self terminate when the Internet connection is terminated. The mail status checker module 114 is independent of the mail application used by a user to access e-mails. In this way, the digital feedback display panel 124 can monitor and display email status to a user without the user running the mail application. When an active Internet connection is available, the mail status checker module 114 can check for e-mail messages periodically after a predetermined number of seconds.

Referring to FIG. 2, a table of exemplary messages for the mail status checker module 114 are shown. A MSC_STARTING message indicates the mail status checker module 114 is beginning the process of checking the number of unread e-mails. A MSC_EXITING message indicates the mail status checker module 114 is completing the process of checking the number of unread e-mails. A MSC_IALIVE_DETECTED message indicates that there is an active Internet connection for the computer system S. A MSC_IALIVE_NOTDETECTED message indicates that there is not an active Internet connection for the computer system S. A MSC_STARTING_RAS_DIAL message indicates that the dialing of a RAS connection is beginning. A MSC_ENDING_RAS_DIAL message indicates that the dialing of a RAS connection is ending. A MSC_RAS_ERROR_ABORTING message indicates that an error occurred in establishing a RAS connection thereby aborting the process. A MCS_USER_DISABLED_ABORTING message indicates that the mail status checker module 114 has been disabled by the user thereby aborting the attempted execution of the mail status checker module 114. A MSC_NO_POP_ACCOUNTS_ABORTING message indicates that the mail status checker module 114 did not detect any mail accounts thereby aborting the attempted execution of the mail status checker module 114. A MSC_INVALID_POP_ACCOUNTS_ABORTING message indicates that the mail status checker module 114 did not detect a valid mail account thereby aborting the attempted execution of the mail status checker module 114. A MSC_GETTING_MESSAGES message indicates the mail status checker module 114 is in the process of retrieving unread e-mails. A MSC_GOT_MESSAGES message indicates the mail status checker module 114 has retrieved the unread email(s). A MSC_UPDATING_LED message indicates that the mail status checker module 114 is updating an LED proximate to the digital feedback display panel 124 to reflect that the unread e-mail(s) are available. A MSC_DONE_UPDATING_LED message indicates that the mail status checker module 114 is done updating an LED of the digital feedback display panel 124. It should be understood that these examples of notification messages are illustrative and are not exhaustive.

Atomic Clock Module

The atomic clock module 116 is used to detect a network time and to update a display clock of the digital feedback display panel 124 accordingly. Like the mail status checker module 114, the atomic clock module 116 is scheduled for launching by the scheduler module 112. Before launching, the atomic clock module 116 determines if its functionality is currently enabled. In the disclosed embodiment, atomic clock module 116 utilizes an active Internet connection. The atomic clock module 116 thus can be configured to only launch if there is already an active Internet connection. Alternatively, a request to launch the atomic clock module 116 can trigger an initiation of an Internet connection, if one is has already been established. When launched, the atomic clock module 116 via the Network Time Protocol (NTP) and the associated server obtains the up-to-date network time for the currently configured time zone of the computer system S. The atomic clock module 116 next updates the operating system clock with the network time, taking account of network delays. The display clock of the digital feedback display panel 124 is then updated with the network time. After this update is complete, the atomic clock module 116 can self terminate in order to preserve system resources. The update by the atomic clock module 116 can occur at the same time as the update of the mail status checker module 114.

Figure 6:
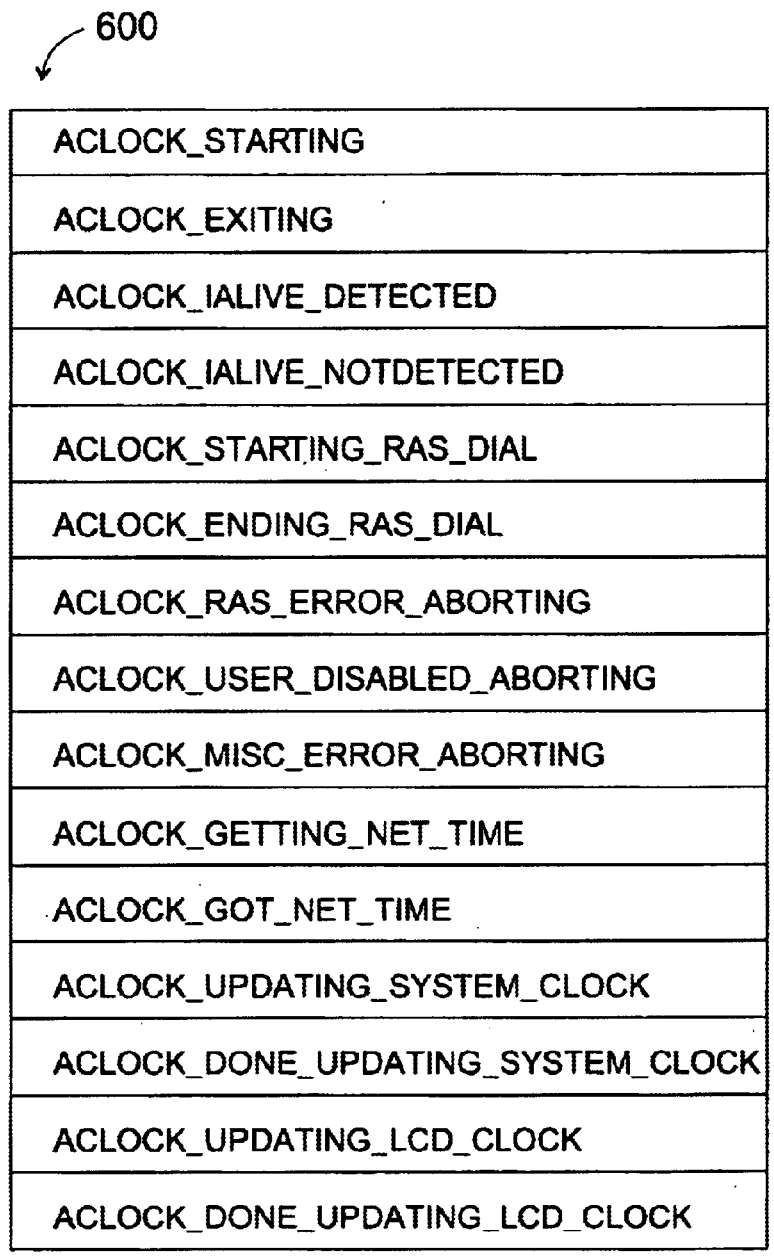
FIG. 6 is a table of exemplary notification messages for the atomic clock software module of FIG. 1.

Referring to FIG. 6, exemplary notification messages for the atomic clock module 114 are shown. An ACLOCK_STARTING message indicates the atomic clock module 116 is starting to run. An ACLOCK_EXITING message indicates the atomic clock module 116 is in the process of terminating. An ACLOCK_IALIVE_DETECTED message indicates that the atomic clock module 116 has detected that an active Internet connection is available. An ACLOCK_IALIVE_NOTDETECTED message indicates that the atomic clock module 116 has detected that an active Internet connection is not available. An ACLOCK_STARTING_RAS_DIAL message indicates that an Internet connection is being established. An ACLOCK_ENDING_RAS_DIAL message indicates that an Internet connection is ending. An ACLOCK_RAS_ERROR_ABORTING message indicates that an error occurred in establishing an Internet connection thereby aborting the process. An ACLOCK_USER_DISABLED_ABORTING message indicates that the atomic clock module 116 detected that a user has disabled the functionality of the atomic clock module 116 thereby aborting the process. An ACLOCK_MISC_ERROR_ABORTING message indicates that a general or undetermined error occurred with the atomic clock module 116 thereby aborting the process. An ACLOCK_GETTING_NET_TIME message indicates that the atomic clock module 116 is retrieving network time. An ACLOCK_GOT_NET_TIME message indicates that the atomic clock module 116 has retrieved the network time. An ACLOCK_UPDATING_SYSTEM_CLOCK message indicates that the atomic clock module 116 is the process of updating the operating system clock with the network time. An ACLOCK_DONE_UPDATING_SYSTEM_CLOCK message indicates that the atomic clock module 116 has updated the operating system clock with the network time. An ACLOCK_UPDATING_LCD_CLOCK signal indicates that the atomic clock module 116 is updating the display clock of the digital feedback display panel 124 with the network time. An ACLOCK_DONE_UPDATING_LCD_CLOCK signal indicates that the atomic clock module 116 has updated the display clock with the network time. It should be understood that these examples of notification messages are illustrative and not exhaustive.

Configuration User Interface Module

Figure 3:
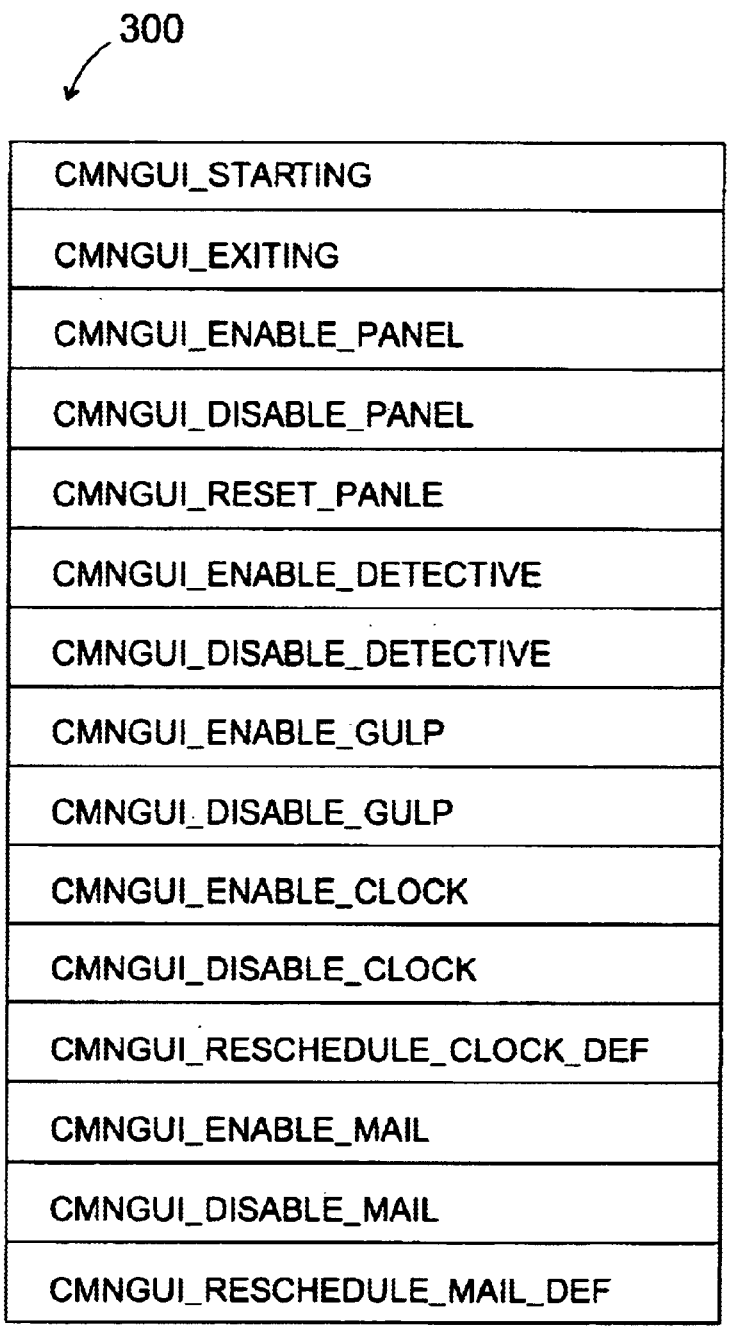
FIG. 3 is a table of exemplary notification messages for the configuration user interface module of FIG. 1.

The configuration user interface module 108, in this case a graphical user interface (GUI) accessible through a control panel of the computer system S, is used to configure other software modules such as the atomic clock module 116, the mail status checker module 114, the Internet detect module 102 and the device detect module 104. The digital feedback display panel 124 can also be configured through the configuration user interface module 108. Referring to FIG. 3, some notification messages for the configuration user interface module 108 which reflect exemplary uses of the module are shown. A CMNGUI_STARTING message indicates the configuration user interface module 108 is beginning to execute. A CMNGUI_EXITING message indicates the configuration user interface module 108 is in the process of terminating. A CMNGUI_ENABLE_PANEL message is used to enable the functionality of the digital feedback display panel 124. A CMNGUI_DISABLE_PANEL message is used to disable the functionality of the digital feedback display panel 124. A CMNGUI_RESET_PANEL message is used to clear or reset the digital feedback display panel 124. A CMNGUI_ENABLE_DETECTIVE message or a CMNGUI_ENABLE_GULP is used to enable the device detect module 104. A CMNGUI_DISABLE_DETECTIVE or a CMNGUI_DISABLE_GULP message is used to disable the device detect module 104. A CMNGUI_ENABLE_CLOCK message is used to enable the atomic clock module 116. A CMNGUI_DISABLE_CLOCK message is used to disable the atomic clock module 116. A CMNGUI_RESCHEDULE_CLOCK_DEF message is used to schedule execution or launching of the atomic clock module 116. A CMNGUI_ENABLE_MAIL message is used to enable the mail status checker module 114. A CMNGUI_DISABLE_MAIL message is used to disable the mail status checker module 114. A CMNGUI_RESCHEDULE_MAIL_DEF message is used to schedule execution or launching of the mail status checker module 114. To reschedule the mail status checker module or the atomic clock module 116, the configuration user interface module 108 launches the scheduler module 112 via the configuration user interface module 108, a user can also add, edit or delete email accounts and set default times for the scheduler module 112.

Those skilled in the art will appreciate the disclosed software modules can be coded for maximum flexibility and code maintenance. It will also be readily appreciated that the disclosed software modules can be written in C++ or C using standard tools such as a Visual C++ compiler, for example. Consistent with this disclosure, it should be understood that the disclosed software modules can be coded in a variety of ways.

Practical Applications

Figure 9:
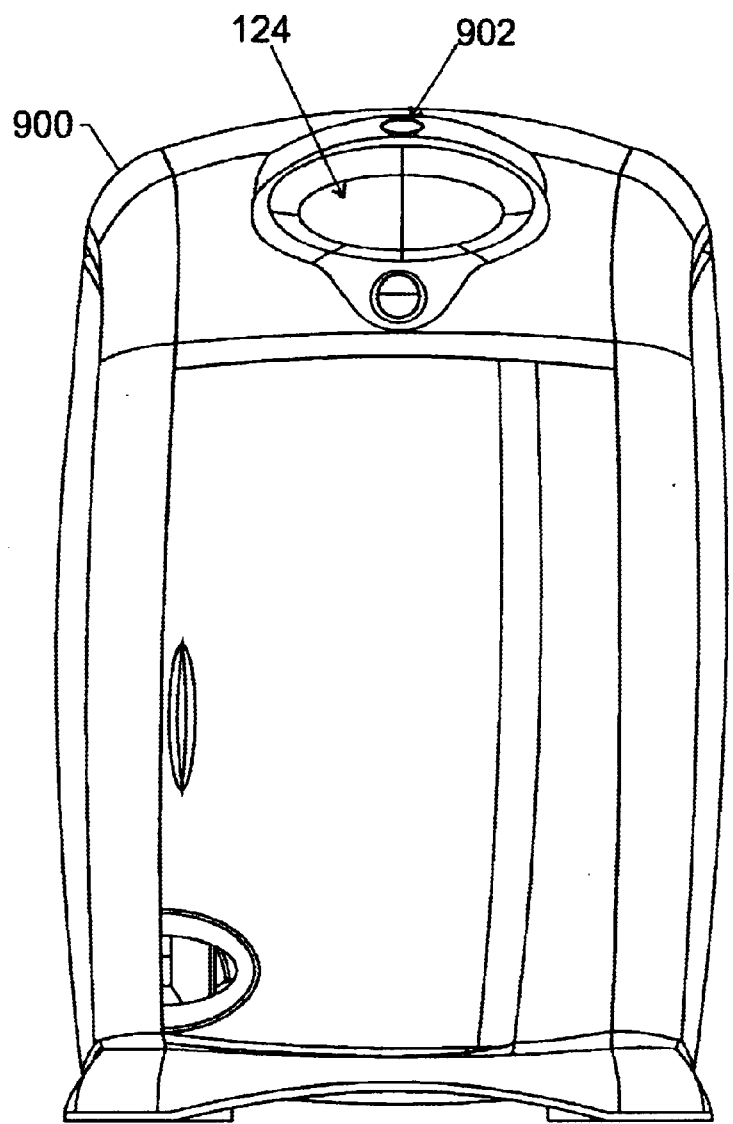
FIG. 9 is a front view of a computer housing including the digital feedback display panel of FIG. 1.
Figure 10:
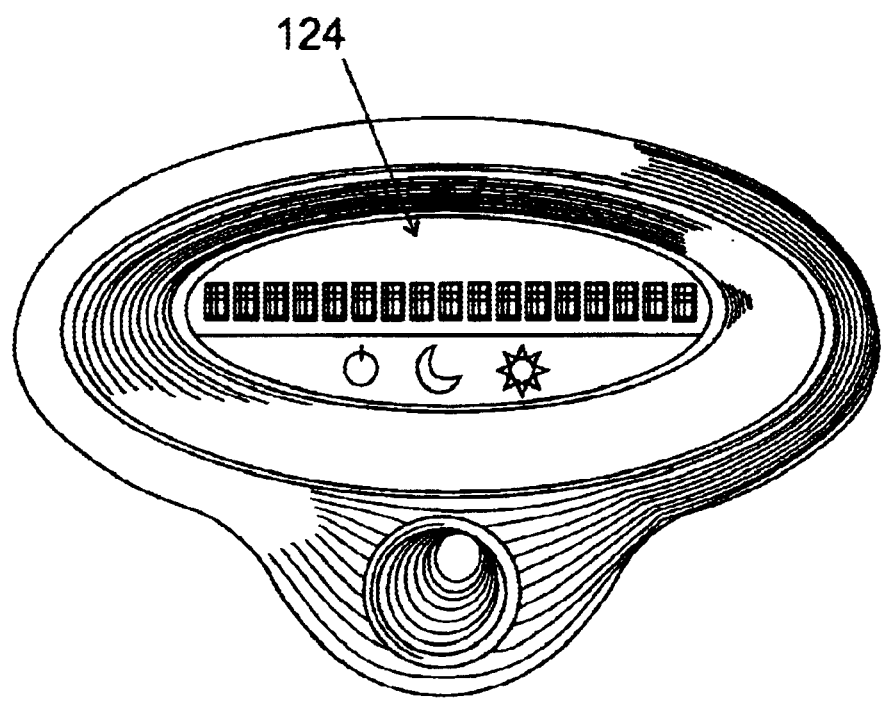
FIG. 10 is a front view of the digital feedback display panel of FIG. 9.

Referring to FIG. 9, a computer housing 900 of the computer system S is shown with the digital feedback display panel 124 integrated into a top portion of the computer housing 900 readily visible to a user. A light emitting diode 902 used as a message light is shown integrated into the computer housing 900 proximate to the digital feedback display panel 124. Referring to FIG. 10, a front view of the digital feedback display panel 124 is shown.

In a disclosed embodiment, the digital feedback display panel provides at least two display areas: an icon display area and a text display area. When the computer system is being set up, both the icon display area and the text display area provide feedback to the user. For example, if a keyboard needs to be connected to the computer system, then the icon display area displays a keyboard icon and the test display area displays a brief blinking message to easily indicate to a user to connect the keyboard. An example of such a message is "PLUG-IN KEYBOARD". Once the keyboard is plugged into the computer system, the message and keyboard icon disappear from the display panel and the computer system beeps to confirm that connection of the keyboard has been detected. During runtime, if the keyboard is disconnected, the keyboard icon and text message can reappear. Feedback can be provided to a user in a similar manner for other types of main peripheral devices.

When the computer system is connecting to the Internet, both the icon display area and the text display area are again used to provide feedback to the user. For example, the icon display area can display an icon such as an encircled and italicized "i" to easily convey to a user that the computer system is in the process of connecting to the Internet. The test display area can display a brief blinking message, such as "connecting to the Internet", to easily indicate to a user that the computer system is in fact connecting to the Internet.

When the text display area is not displaying a useful text message for the user, the text display area can be used to provide the display clock. The display clock can display time in hours and minutes only. Unlike a conventional clock provided on a task bar of a main display screen, one advantage of the display clock of the digital feedback display panel is an ability to determine the time when the conventional task bar clock is not visible. An example of such a time is when a computer system is in a screen saver mode.

When the computer system is in a sleep state, the digital feedback display panel can be used to readily convey a sleep state to a user. The text display area can display a brief blinking message to easily indicate to a user that the computer system is in a sleep state. An example of such a message is "ZZZZ . . . ZZZZ". At the same time, the icon display area can display an icon to easily indicate to a user that the computer system is in a sleep state.

As another example, the digital feedback display panel can be used to inform a user that an application is opening while the computer system is on the Internet. Taking Microsoft Word® as an example of an application, the text display area can display the message "Opening Microsoft Word®" while the icon display area displays a icon representative of the Microsoft Word® application. In each of the above examples, visual feedback is provided to a user as both an icon and as a text message.

As a last example, in connection with the mail status checker module 114 as described above, the text display area can display "2 NEW MESSAGES" in response to the mail status checker module 114 detecting two unread e-mail messages.

The disclosed feedback display panel and supporting software thus can address many of the problems user have faced in setting up and using computer systems. Basically, the feedback display panel (also termed a digital dashboard) is to a user as a dashboard is to a driver. The comfort and familiarity with a car which a driver gains from a dashboard is the sort of experience a personal computer user can gain from the digital feedback display panel. Further, like a dashboard of a car, the digital feedback display panel provides visual feedback to a user in connection with audio feedback, as the supporting software of the digital feedback display panel can be configured to activate speakers in a computer system in conjunction with visual feedback.

Aside from setting up a computer system and the uses of a computer system described above, the disclosed feedback display panel and supporting software are essentially applicable to any use or configuration of a computer system, such as upgrading and troubleshooting a computer system, for example.

The foregoing disclosure and description of various embodiments are illustrative and explanatory thereof, and various changes in the software modules, notification messages, status conditions, icons, text messages, network protocols, and the like, as well as in the details of the illustrated hardware and software and construction and method of operation may be made without departing from the spirit of the invention.

We claim:

1. A method of providing digital computer status feedback for a user, the method comprising the steps of:

detecting a status notification message for a computer system; and communicating feedback to a user through a digital feedback display panel integrated with a computer housing of the computer system based on the status notification message, wherein the status notification message comprises an e-mail status notification indicating the number of unread e-mails for the computer system, the communicating step comprising the step of:

setting a state of a light emitting diode integrated into the computer housing proximate to the digital feedback display panel to indicate the number of unread e-mails.

2. A method of providing digital computer status feedback for a user, the method comprising the steps of:

detecting a status notification message for a computer system; and communicating feedback to a user through a digital feedback display panel integrated with a computer housing of the computer system based on the status notification message; and communicating initialization feedback to the user on the digital feedback display panel before the detecting step, wherein the initialization feedback comprises display of a plurality of status icons to the user on the digital feedback display panel, the plurality of status icons representing a plurality of peripheral devices for connecting to the computer system, wherein each status icon of the plurality of status icons disappears from the digital feedback display panel if a corresponding peripheral device is connected to the computer system.

3. A method of providing digital computer status feedback for a user, the method comprising the steps of:

detecting a status notification message for a computer system; and communicating feedback to a user through a digital feedback display panel integrated with a computer housing of the computer system based on the status notification message, the communicating step comprising the step of:

selectively displaying a message for the user on the digital feedback display panel based on the status notification message;

wherein the status notification message comprises a network time for a server coupled to the computer system.

4. The method of claim 3, the communicating step comprising the step of:

updating a display clock on the digital feedback display panel based on the network time.

5. A computer system adapted for digital computer status feedback, computer system comprising:
- a means to detect a status condition of the computer system;
- a means to process the status condition; and
- a digital feedback display panel integrated with a computer housing of the computer system to display a message to a user based on the status condition where the status condition comprises a network time for a server coupled to the computer system.

6. A method of providing peripheral device connection information for a computer system to a user, the method comprising:
- displaying a plurality of status icons on a digital feedback display panel integrated with a computer housing of the computer system, the plurality of status icons representing a plurality of peripheral devices for connecting to the computer system; and
- removing a status icon of the plurality of status icons from the status display panel if a corresponding peripheral device is connected to the computer system.

* * * * *